United States Patent [19]

Ladha et al.

[11] B 4,000,065
[45] Dec. 28, 1976

[54] METHOD AND APPARATUS FOR PURIFYING AQUEOUS STREAMS CONTAMINATED WITH ORGANIC MATERIALS

[75] Inventors: Kamal K. Ladha, Riverview; William M. Herring, Trenton; Joseph F. Louvar, Lincoln Park, all of Mich.

[73] Assignee: BASF Wyandotte Corporation, Wyandotte, Mich.

[22] Filed: Nov. 18, 1974

[21] Appl. No.: 524,806

[44] Published under the second Trial Voluntary Protest Program on March 2, 1976 as document No. B 524,806.

[52] U.S. Cl. ............................ 210/23 H; 210/23 F; 210/321 R
[51] Int. Cl.$^2$ .................. B01D 31/00; B01D 13/00
[58] Field of Search ........... 210/22, 23, 321, 500 M

[56] References Cited
UNITED STATES PATENTS

| | | | |
|---|---|---|---|
| 3,228,876 | 1/1966 | Mahon | 210/22 |
| 3,617,550 | 11/1971 | Elata et al. | 210/321 X |
| 3,836,457 | 9/1974 | Gross et al. | 210/321 X |
| 3,839,201 | 10/1974 | Miller | 210/500 M X |

*Primary Examiner*—Frank A. Spear, Jr.
*Attorney, Agent, or Firm*—Bernhard R. Swick; L. S. Van Landingham, Jr.; Robert E. Dunn

[57] ABSTRACT

Aqueous streams contaminated with minor amounts of organic materials are separated into an aqueous fraction which is concentrated with respect to the organic contaminants and a water fraction relatively free of the organic contaminants by a method which includes a unique combination of reverse osmosis (RO) and ultrafiltration (UF). The organic contaminants include substances having molecular weights of less than 10,000 which are soluble in the aqueous stream initially but have limited solubility ranges and are precipitated therefrom upon concentration. The contaminated aqueous stream is circulated from the high pressure compartment of a RO unit to the high pressure compartment of an UF unit, then to the low pressure compartment of the UF unit, and then back to the high pressure compartment of the RO unit. The contaminants are concentrated in the high pressure compartment of the RO unit, and a portion thereof is precipitated or otherwise rendered amenable to removal along with the UF concentrate upon passing the RO concentrate from the high pressure compartment of the RO unit to the high pressure compartment of the UF unit. Soluble organic contaminants remaining in the aqueous stream are removed in the UF permeate and are recycled back to the high pressure compartment of the RO unit for further concentration and precipitation, followed by recycling to the high pressure compartment of the UF unit for removal.

47 Claims, 3 Drawing Figures

METHOD AND APPARATUS FOR PURIFYING AQUEOUS STREAMS CONTAMINATED WITH ORGANIC MATERIALS

THE BACKGROUND OF THE INVENTION

1. The Field of the Invention

The present invention broadly relates to the purification of aqueous media contaminated with organic materials. In one of its more specific variants, the invention is concerned with a novel method of separating aqueous streams contaminated with organic materials into an aqueous fraction relatively concentrated with respect to the organic contaminants, and a water fraction relatively free of organic contaminants. The invention is further concerned with apparatus which is especially useful in practicing the method of the invention.

2. The Prior Art

Industrial waste water streams often contain low concentrations of contaminants and in order to meet the statutory requirements of pollution control laws, must be purified prior to disposal. The contaminants may include organic materials having relatively high molecular weights and low molecular weights having varying solubility ranges. Dissolved and/or precipitated inorganic materials also may be present. Thus, the contaminants may be a highly complex nature of soluble and insoluble organic and inorganic materials having low and/or high molecular weights and may include contaminant species which are ionic and/or nonionic in character.

When organic contaminants of the above types are present in very low concentrations, such as from 100 to 10,000 parts per million (ppm), when following prior art practices it is often impossible from the practical standpoint, and always expensive to separate the contaminated aqueous stream into (1) a concentrate of the organic contaminants which may be used directly or further processed into useful products, and (2) substantially pure water which may be recycled or disposed of without incurring a pollution problem. A number of prior art processes are technically feasible such as complete evaporation of the contaminated aqueous stream and condensation of the water vapor and recovery of the dry contaminants, or partial concentration followed by crystallization or precipitation of the contaminants and separation of the aqueous phase therefrom. These prior art processes all involve phase changes with prohibitively high energy requirements to effect the concentration of the contaminants. As a practical matter, such processes are not economically feasible due to their high costs and the relatively low value of the contaminant concentrate and/or pure water products that are produced.

A number of membrane purification methods have been developed recently which do not require a phase change such as reverse osmosis (RO), ultrafiltration (UF), and electrodialysis. these membrane purification methods have proved to be very useful in purifying waste water having one or more specific contaminants which meet the requirements of the selected method. However, such membrane methods all have important disadvantages when used alone, or when used in the prior art combinations for the purification of waste water streams of the types described herein.

By way of example, reverse osmosis is practical only when the concentration of the contaminants in the RO concentrate stream is at a sufficiently low level to allow practical operating pressures to be employed such as about 1000 psi and lower. Ultrafiltration as practiced in the prior art is capable of separating only those contaminants which have molecular weights above 10,000 or substances which are precipitated and thus are not in solution. Electrodialysis is effective only when the contaminants are ionic in nature. Thus, no one prior art membrane purification method provides a practical method of purifying an industrial waste water stream which contains contaminants of the types described above.

A number of proposals have been made wherein two or more membrane separation methods are combined for the purpose of overcoming the disadvantages of each method when used alone. However, these prior art proposals are not effective in overcoming the operating difficulties experienced in the purification of industrial waste water streams of the type described herein. Accordingly, the prior art has long sought an entirely satisfactory membrane purification method which is capable of separating an aqueous stream contaminated with small amounts of soluble and insoluble organic and/or inorganic materials of low and/or high molecular weights into an aqueous fraction which is relatively concentrated with respect to the organic contaminants, and a water fraction which is relatively free of the organic contaminants. Preferably, the aqueous organic fraction should be sufficiently concentrated to permit its use directly or its further processing into useful products, and the water fraction should be of sufficient purity for recycle or disposal without a pollution problem. In such event, the two products produced by the purification step would each have utility and the combined value thereof would offset or at least reduce the costs of purification.

THE SUMMARY OF THE INVENTION

The present invention overcomes the above described and other deficiencies of the prior art membrane separation methods and apparatus when used to purify the contaminated aqueous media described herein. This is accomplished by employing a novel combination of reverse osmosis and ultrafiltration techniques, and by providing an improved water purification system which includes a reverse osmosis unit and an ultrafiltration unit constructed and arranged so as to overcome the prior art deficiencies of each unit when used alone in the environment of the invention. When practicing the novel method of the invention and/or when using the improved apparatus of the invention, it is possible to separate aqueous media contaminated with small amounts of organic materials into an aqueous fraction which is relatively concentrated with respect to the organic contaminants, and a water fraction substantially free of the organic contaminants. The concentrate of organic contaminants has utility as produced, or it may be further processed into useful products which have value. Similarly, the pure water fraction may be recycled or it may be disposed of without incurring pollution problems.

The accompanying illustrative drawings, the specific examples, and the detailed description of the preferred variants and embodiments of the method and apparatus of the invention appearing hereinafter may be referred to for a more complete and comprehensive understanding of the invention.

A BRIEF DESCRIPTION OF THE ACCOMPANYING DRAWINGS

The method and apparatus of the present invention will be described hereinafter in greater particularity with reference to the variants and embodiments thereof illustrated in the accompanying drawings, wherein.

The Detailed Description of the Present Invention Including Preferred Variants and Embodiments Thereof In accordance with one variant of the present invention, contaminated aqueous streams are separated into an aqueous fraction which is relatively concentrated with respect to the contaminants, and a water fraction which is relatively free of the contaminants by a novel method which employs a unique combination of reverse osmosis (RO) and ultrafiltration (UF). The contaminants include low molecular weight organic substances which are soluble in the aqueous stream initially but have limited solubility ranges and are precipitated therefrom upon concentration. The contaminants also may include dissolved and/or undissolved organic materials having a relatively high molecular weight and varying solubility ranges as will be described more fully hereinafter. Dissolved and/or undissolved inorganic materials also may be present but are in concentrations sufficiently low to allow the RO unit to be operated at a practical pressure.

The contaminated aqueous stream is circulated from the high pressure compartment of a RO unit to the high pressure compartment of an UF unit, then to the low pressure compartment of the UF unit, and thereafter is recycled back to the high pressure compartment of the RO unit. All or a portion of the contaminants are precipitated or otherwise rendered amenable to separation as UF concentrate by concentrating the contaminated aqueous stream in the high pressure compartment of the RO unit. The resultant RO concentrate is passed to the high pressure compartment of the UF unit where UF concentrate is produced which contains the precipitated contaminants and any other contaminants rejected by the UF membrane. The UF permeate contains soluble organic contaminants and other contaminants which pass through the UF membrane and it is recycled back to the high pressure compartment of the RO unit for further concentration and precipitation of the contaminants, followed by recycle of the RO concentrate to the high pressure compartment of the UF unit for removal of the precipitated contaminants in the UF concentrate. The above steps are preferably, but not necessarily, practiced on a continuous basis to thereby produce RO permeate which may be substantially pure water, and an aqueous UF concentrate which contains the organic contaminants. The water fraction produced as RO permeate may be recycled in industrial processes or otherwise used as fresh water. The organic contaminants in the aqueous UF concentrate may be recovered for use in industrial processes or for sale as marketable products upon further processing, or the UF concentrate may be used directly as a boiler fuel or fuel supplement without further processing.

Figure 1:
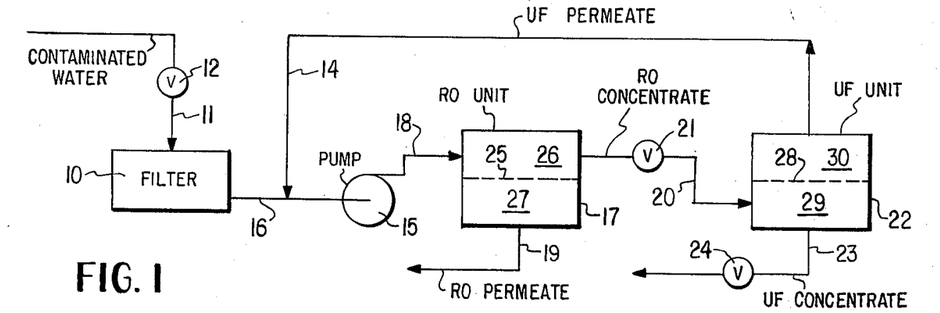
FIG. 1 is a schematic flow diagram of one presently preferred water purification system for removing organic contaminants in accordance with the principles of the present invention.

Referring now to FIG. 1 of the drawings, contaminated aqueous medium to be purified, such as a polyol plant waste water stream, is fed to filter 10 via conduit 11 at rate controlled by valve 12. The filter 10 is for the purpose of removing large particles of extraneous impurities such as wood chips, debris, and the like, and it may be, for example, a sand filter or a screen having a mesh size of about 5 microns. The fresh feed of filtered contaminated water and the UF permeate flowing in conduit 14 are admixed and fed to the inlet side of pump 15 via conduit 16.

The RO unit 17 includes a high pressure compartment 26 and a low pressure compartment 27 separated by a reverse osmosis membrane 25. The pump 25 delivers the admixture of fresh contaminated water and UF permeate via conduit 18 at a predetermined feed rate and under a predetermined pressure and it is introduced into the high pressure compartment 26. The operating pressure of compartment 26 is above the osmotic pressure of the contaminated water flowing therethrough, and the pressure is sufficiently above the osmotic pressure to cause a permeate fraction to flow through the membrane 25 and collect in low pressure chamber 27 which operates at approximately atmospheric pressure. The resulting RO permeate is withdrawn from the low pressure chamber 27 via conduit 19 at approximately atmospheric pressure. The RO permeate stream flowing in conduit 19 has a very low concentration of contaminants, such as 20 parts per million by weight or less, and thus is substantially pure water.

The UF unit 22 includes a high pressure compartment 29 and a low pressure compartment 30 separated by an UF membrane 28. The RO concentrate stream is withdrawn from high pressure compartment 26 via conduit 20 and is passed through pressure reducing valve 21 where the higher operating pressure existing in compartment 26 is reduced to the lower operating pressure of compartment 29 prior to introducing the RO concentrate therein. The compartment 29 is operated at a pressure markedly less than the pressure in the RO high pressure compartment 26, but at a pressure sufficiently elevated to cause a UF permeate fraction to pass through the membrane 28 into compartment 30 which is at approximately atmospheric pressure. The UF permeate is withdrawn from compartment 30 via conduit 14 and is recycled to the inlet side of pump 15 and compartment 26 as previously described. The UF permeate flowing in conduit 14 contains contaminants which are not rejected by the membrane 28 such as dissolved organic materials having a sufficiently low molecular weight to allow the molecules to pass through the pores in the UF membrane and dissolved inorganic materials. Organic materials of relatively high molecular weight, i.e., where the organic molecule is sufficiently large to prevent it from passing through the pores in the membrane 28, and undissolved particles of both inorganic and organic materials are rejected by the membrane 28 and are withdrawn from compartment 29 via conduit 23 as an aqueous UF concentrate fraction. The pressure on the UF concentrate is reduced upon passing through pressure reducing valve 24 and it is then withdrawn via conduit 23 at approximately atmospheric pressure. The concentration of contaminants in the UF concentrate may vary, for example, from about 4 to 40% by weight, and preferably is approximately 15–25% by weight.

The arrangement of apparatus illustrated in FIG. 1 is especially useful when purifying contaminated waste water containing initially little, if any, impurities which are capable of being rejected by membrane 28. The RO unit 17 is operated so as to concentrate the feed stream flowing in conduit 18 sufficiently to precipitate or otherwise cause at least a portion of the initially dissolved organic contaminants to be rejected by membrane 28. The UF unit 22 is operated so as to produce a relatively high concentration of contaminants in the UF concentrate stream flowing in conduit 23, and a sufficiently low concentration of contaminants in the UF permeate stream flowing in conduit 14 to prevent the osmotic pressure of the contaminated water flowing through RO unit 17 from increasing to an impractical level. Thus, the RO unit 17 and UF unit 22 are operated under conditions whereby it is possible to take advantage of the desirable characteristics of each unit.

It may be noted that only one pump is required to operate the purification system illustrated in FIG. 1 and thus the power requirements and operating costs are very low. Additionally, it is possible to concentrate the organic contaminants in the UF concentrate sufficiently high to allow the same to be used in industrial processes or recovered as a saleable product, and in instances where the organic contaminants are highly combustible and of relatively low economic value, it is possible to use the UF concentrate as a fuel or supplemental fuel. The RO permeate stream may be recycled in the plant and/or otherwise used in a manner similar to fresh water derived from municipal water supplies in view of the very low contaminant content. In each instance, the UF concentrate and the RO permeate are useful products having economic value and the pollution problem presented by the initial contaminated water is eliminated.

Figure 2:
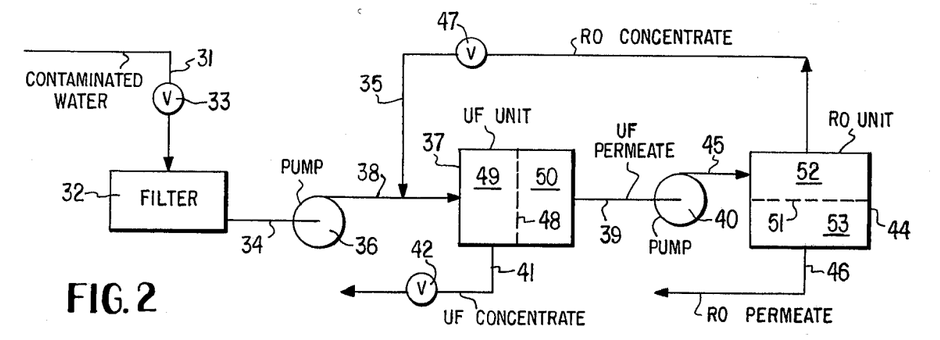
FIG. 2 is a schematic flow diagram of a further presently preferred water purification system for removing organic contaminants from waste water in accordance with the principles of the present invention.

FIG. 2 of the drawings illustrates one presently preferred arrangement of apparatus for purifying contaminated aqueous streams which contain initially a substantial amount of contaminants capable of being concentrated directly by a UF unit. Referring now to FIG. 2 of the drawings, the contaminated water stream flowing in conduit 31 is passed to filter 32 at a rate controlled by valve 33. The filter 32 may be a sand filter or coarse screen having a mesh size of about 1–2. Filtered fresh contaminated water is withdrawn from filter 32 via conduit 34 and is passed to the entrance side of pump 36. The admixture of RO concentrate from the stream flowing in conduit 35 and fresh contaminated feed water is introduced into high pressure compartment 49 of UF unit 37 via conduit 38 at a desired predetermined feed rate and under a suitable predetermined pressure. The UF unit 37 may be operated under the same general conditions as previously described for UF unit 22. The pressure existing in compartment 49 is sufficiently high to cause UF permeate to flow through UF membrane 48 into low pressure compartment 50 which is at approximately atmospheric pressure. The UF permeate, which contains dissolved organic and inorganic molecular species sufficiently small to pass through the pores of the membrane 48, is withdrawn via conduit 39 and passed to the entrance side of pump 40. The UF concentrate, which contains dissolved organic and inorganic molecular species sufficiently large to prevent their passing through the pores of membrane 48 and undissolved organic and inorganic materials, is withdrawn from compartment 49 via conduit 41 and the pressure thereon is reduced to approximately atmospheric pressure upon passing through pressure reducing valve 42.

The UF permeate flowing in conduit 39 is introduced into high pressure compartment 52 of the RO unit 44 via conduit 45 at a desired rate and under a suitable pressure determined by the operation of pump 40. The RO unit 44 may be operated under the same general conditions as previously described for Ro unit 17. The pressure existing in compartment 52 is above the osmotic pressure of the contaminated water flowing therethrough and is sufficiently elevated thereabove to result in RO permeate flowing by reverse osmosis through the osmotic membrane 51 into low pressure compartment 53 which is at approximately atmospheric pressure. The RO permeate contains very small amounts of contaminants as previously described in FIG. 1 and is withdrawn via conduit 46 as a substantially pure water fraction. The RO concentrate fraction rejected by osmotic membrane 51 has been concentrated sufficiently to precipitate contaminants including organic contaminants which may be removed in the concentrate produced by UF unit 37. The RO concentrate is withdrawn via conduit 35 including back pressure reducing valve 47 and, after the pressure thereon has been reduced to a desired lower pressure which approximates the operating pressure of compartment 49, is introduced into compartment 49 via conduit 38.

The UF unit 37 and the RO unit 44 may be operated under the general conditions previously described for UF unit 22 and RO unit 17 in the discussion of FIG. 1 to take advantage of the desirable characteristics of each unit. Also, the Ro permeate and UF concentrate produced by the apparatus of FIG. 2 may have the general properties, characteristics and uses previously described for the RO permeate and UF concentrate produced by the apparatus of FIG. 1.

Figure 3:
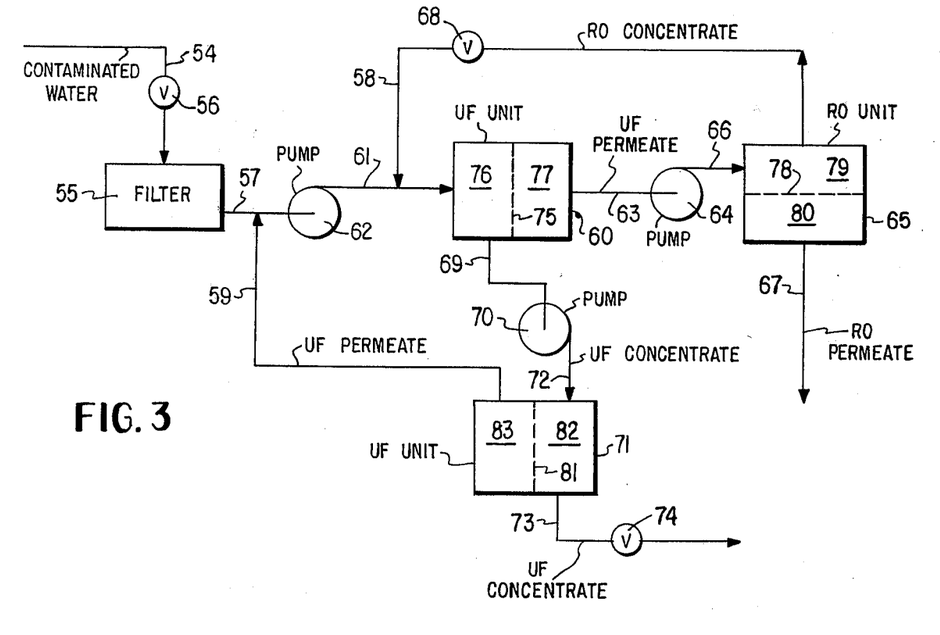
FIG. 3 is a schematic flow diagram of still another presently preferred water purification system for removing organic contaminants from waste water in accordance with the principles of the present invention.

FIG. 3 of the drawings illustrates a presently preferred arrangement of apparatus for purifying contaminated water which contains initially a substantial amount of contaminants capable of being removed by a UF unit, and which may be further concentrated to the desired solids content in a second UF unit. Referring now to FIG. 3 of the drawings, the contaminated water stream flowing in conduit 54 is introduced into filter 55 at a rate controlled by valve 56. The filtered fresh feed of contaminated water is withdrawn via conduit 57 and, together with the UF permeate flowing in conduit 59, is passed to pump 62 and then, together with the RO concentrate stream flowing in conduit 58, is introduced into high pressure compartment 76 of UF unit 60 via conduit 61 at a rate and under a pressure determined by the operation of pump 62. The pressure within high pressure compartment 76 is sufficiently high to result in UF permeate being forced through UF membrane 75 into low pressure compartment 77.

The UF permeate thus produced is withdrawn via conduit 63, passed to the entrance side of pump 64, and then is introduced into high pressure compartment 79 of RO unit 65 via conduit 66 at a desired rate and under a suitable pressure determined by the operation of pump 64. The pressure existing within compartment 79 is above the osmotic pressure of the contaminated water flowing therethrough, and the pressure is sufficiently thereabove to result in RO permeate passing through the RO membrane 78 into low pressure compartment 80 by reverse osmosis. The RO permeate is substantially pure water and contains substantially no contaminants are previously described in the discussion of FIG. 1. The RO permeate is withdrawn via conduit 67 and may be used as previously described for FIG. 1. The RO concentrate rejected by membrane 78 is concentrated sufficiently to produce precipitated contaminants including organic materials which may be removed by UF unit 60. The RO concentrate is withdrawn via conduit 58 and, after passing through back pressure reducing valve 68, is introduced into conduit 61 at approximately the pressure existing therein and is recycled to compartment 76 where the precipitated contaminating species are rejected by membrane 75. The UF concentrate rejected by membrane 75 is withdrawn via conduit 69 and is passed to the entrance side of pump 70, and is then introduced into high pressure compartment 82 of UF unit 71 via conduit 72 at a desired feed rate and under a suitable pressure determined by the operation of pump 70. The operating pressure within compartment 82 is sufficiently high to result in UF permeate being forced through UF membrane 81 into low pressure compartment 83. The resulting UF permeate is recycled via conduit 59, conduit 57, pump 62 and conduit 61 to the high pressure compartment 76 of UF unit 60. The UF concentrate rejected by membrane 81 is withdrawn via conduit 73, and the pressure thereon is reduced to approximately atmospheric after passing through back pressure reducing valve 74.

The UF concentrate and the RO permeate produced by the apparatus of FIG. 3 may have the general properties, characteristics and uses as that previously described for FIGS. 1 and 2. Additionally, the UF units 60 and 71, and the RO unit 65, may be operated under the general conditions previously described for UF unit 22 and RO unit 17, respectively.

The present invention is useful in removing dissolved organic materials which have limited solubility in aqueous media and molecular weights too low to be separated in an UF unit following conventional techniques. The invention may be used, for example, in purifying plant waste waters containing organic polymers having high molecular weights and varying solubility ranges in water, and/or low molecular weights and low solubility ranges in water. A wide variety of waste water streams are known and include, for example, waste water resulting from washing inorganic contaminants such as catalyst residues from polymers, and other processing steps wherein polymers are intimately contacted with an aqueous phase which is subsequently separated therefrom. The waste water usually contains small amounts of the organic polymer, organic solvents and/or other organic compounds, e.g., 100–10,000 ppm, and often small amounts of inorganic contaminants such as 1–100 ppm.

The present invention is especially useful in processing polyol plant waste waters. Polyol plant waste water streams are well known in the art and are produced by processes disclosed in a number of references including u.S. Pat. No. 3,823,145, the disclosure of which is incorporated herein by reference. Waste water streams resulting from the purification of polyols by the process of this patent are essentially dilute aqueous streams which contain both dissolved and undissolved polyols of both high and low molecular weights and in some instances dissolved and/or undissolved inorganic salts and other inorganic impurities.

The polyols are essentially hydroxyl terminated polyether polyols and they include the polyoxyalkylene ether glycols which have the general formula H(OR)$_n$OH, wherein R is an alkylene radical and $n$ is an integer which in a preferred embodiment, is sufficiently large whereby the compound has a molecular weight of at least 300. Specific examples of polyols include those prepared by condensing monomeric units such as ethylene oxide, propylene oxide, butylene oxide, and admixtures thereof with compounds containing active hydrogen such as 1,2-propylene glycol, 1,3-propylene glycol, 1,2-butanediol, 1,3-butanediol, 1,4-butanediol, hexanetriol, glycerol, trimethylolpropane, hydroquinone, pentaerythritol, alpha-methyl glucoside, sorbitol and sucrose; acids such as adipic acid, succinic acid, aconitic acid, trimellitic acid and phosphoric acids; amines such as methyl amine, ethyl amine, ethylene diamine, diethylene triamine, toluene diamine, aniline, methylene dianiline, piperazine, and triisopropanol amine; phenolic compounds such as bisphenol, pyrogallol, resorcinol and inositol; mercaptans such as 1,2-ethanedithiol and 1,2,3-propane trithiol; and acid amides such as acetamide and benzyl sulfonamide. Some specific polyols include polyoxypropylene glycol, polyoxybutylene glycol, polytetramethylene glycol block copolymers and especially block copolymers having the general formula:

$$HO(C_2H_4O)_n(C_3H_6O)_m(C_2H_4O)_nH$$

wherein $n$ and $m$ are collectively sufficient for attainment of the desired minimum molecular weight of 300. Still other polyols are copolymers of poly-1,2-oxybutylene and polyoxyethylene glycols; and poly-1,4-oxybutylene and polyoxyethylene glycols, and random copolymer glycols prepared from blends or sequential addition of two or more alkylene oxides as well as glycols as described above capped with ethylene oxide units. The polyols also may contain arylene or cycloalkylene radicals together with the alkylene radicals such as, for example, in the condensation product of a polyoxyalkylene ether glycol with a,a'-dibromo-p-xylene in the presence of a catalyst. In polyols of this type, the cyclic groups inserted in the polyether chain are preferably phenylene, naphthalene or cyclohexylene radicals, or radicals containing alkyl or alkylene substituents such as in tolylene, phenylethylene or xylylene radicals.

The following examples of specific polyols further illustrate the types of polyols which may be present in waste water streams to be purified in accordance with the invention:

1. Glycerol-propylene oxide-ethylene oxide adducts having molecular weights of about 3000 and containing about 9% by weight of ethylene oxide;

2. Glycerol-propylene oxide-ethylene oxide adducts having molecular weights of about 3600 and containing about 3% by weight of ethylene oxide;

3. Glycerol-propylene oxide-ethylene oxide adducts having molecular weights of about 3700 and containing about 8% by weight of ethylene oxide;

4. Glycerol-propylene oxide-ethylene oxide adducts having molecular weights of about 2800 and containing about 12% by weight of ethylene oxide;

5. Glycerol-propylene oxide-ethylene oxide adducts having molecular weights of about 3500 and containing about 4% by weight of ethylene oxide units;

6. Glycerol-propylene oxide-ethylene oxide adducts having molecular weights of about 3300 and containing about 12% by weight of ethylene oxide units;

7. Polyoxypropylene glycols having molecular weights of about 2000;

8. Polyoxypropylene adducts of trimethylolpropane having average molecular weights of about 4500;

9. Polyoxyethylene adducts of polyoxypropylene bases having molecular weights of about 1750 wherein the oxyethylene content is about 10 weight percent of the molecule;

10. Hydroxypropylated bisphenol A having average molecular weights of about 400;

11. Polyoxypropylene adducts of trimethylolpropane having molecular weights of about 6000;

12. Glycerol-butylene oxide adducts having molecular weights of about 2000;

13. Polyoxypropylene glycols having molecular weights of about 3000;

14. Glycerol-propylene oxide adducts having molecular weights of about 3000;

15. Trimethylolpropane-propylene oxide-ethylene oxide adducts having molecular weights of about 6000 and containing about 15% by weight of ethylene oxide;

16. Propylene oxide adducts of pentaerythritol having molecular weights of about 400;

17. Propylene oxide adducts of trimethylolpropane having molecular weights of about 425;

18. Polyoxyethylene adducts of polyoxypropylene bases having molecular weights of about 2000 wherein the oxyethylene content is about 40% by weight;

19. Polyoxyethylene adducts of polyoxypropylene bases having molecular weights of about 2500 wherein the oxyethylene content is about 50% by weight;

20. Polyoxypropylene adducts of ethylene diamine having molecular weights of about 500;

21. Trimethylolpropane-propylene oxideethylene oxide adducts having molecular weights of about 3900 containing about 26% by weight of ethylene oxide;

22. Polyoxypropylene glycols having molecular weights of about 750;

23. Polyoxyethylene adducts of polyoxypropylene bases having molecular weights of about 1750 wherein the oxyethylene content is about 50% by weight of the molecule; and 24. Polyoxyethylene adducts of polyoxypropylene bases having molecular weights of about 1700 wherein the oxyethylene content is about 13% by weight of the molecule.

In view of the foregoing, the contaminated aqueous medium contains at least one contaminating organic material having a molecular weight of less than 10,000 and preferably 300–7000 which is soluble therein to some extent initially, but which has a solubility range such that at least a portion of the solublized organic material is precipitated from the reverse osmosis concentrate and is retained thereafter by the ultrafiltration membrane and is withdrawn with the ultrafiltration concentrate. The invention is especially effective in removing polyols having molecular weights of about 300–7000 and preferably about 400–4000 and the foregoing solubility characteristics.

The polyols described herein have been found to be less soluble at elevated temperatures than at normal room termperature. Thus, in accordance with a further variant of the invention, the aqueous stream is heated to an elevated temperature which is sufficiently high to promote the precipitation of the polyol from the reverse osmosis concentrate. The aqueous stream and preferably the RO concentrate may be heated, for example, to about 40°–100°C and preferably about 50°–70°C prior to introducing the same into the high pressure compartment of the UF unit.

The precipitate of organic contaminants which forms in the RO concentrate may be a conventional precipitate, i.e., a visible deposit of solid phase organic contaminant, or colloidal or micelle-like particles which often are not visible to the unaided eye but yet are rejected by the UF membrane. Thus, the term "precipitate" or "precipitated" as used in the specification and claims is intended to embrace any phenomenon occurring upon concentration of the UF permeate in the RO high pressure compartment which causes the previously soluble organic contaminants in the RO concentrate to be rejected by the UF membrane and separated thereby in the UF concentrate. Often most of the precipitate in the RO concentrate is in extremely finely divided form and is thought to be colloidal or micelle-like particles. This is very advantageous from the standpoint of operating the RO unit as larger particles of solids tend to plug or damage the RO membrane and interfere with the proper operation thereof. It is therefore possible to introduce the fresh feed of contaminated water first into the UF unit when the feed initially contains large solid particles capable of being rejected by the UF membrane, and thereafter the UF permeate is introduced into the RO unit. This method of operating avoids plugging or damaging the RO membrane as the finely divided precipitate which forms in the RO concentrate is not a problem in this respect.

The individual RO and UF units used in practicing the invention may be of the usual prior art design and construction. Also, each RO and UF unit may be operated in accordance with prior art practice insofar as the necessary individual temperatures, pressures, feed rates, etc. are concerned. The operating pressure for the high pressure compartment of the RO unit is in excess of the osmotic pressure of the RO concentrate and sufficiently elevated to produce a reverse osmosis permeate which passes through the reverse osmosis membrane into the RO low pressure compartment which operates at about atmospheric pressure. The RO operating pressure is usually less than 1000 psi and preferably about 300–800 psi with the foregoing limitations. The UF high pressure compartment is usually operated at less than 200 psi and preferably about 40–80 psi, and at a sufficiently elevated pressure within these limits to cause UF permeate to pass through the UF membrane into the low pressure compartment which operates at about atmospheric pressure. The operating temperature is usually no greater than 100°C, and often it is at ambient temperature for both the RO and UF units. However, elevated temperatures may be used as previously mentioned to aid in precipitating the organic contaminants. While the general operation of each individual RO and UF may be as in the prior art, it is understood that the circulation of the contaminated water between the various RO and UF compartments must be as described herein in order to obtain the benefits of the invention.

The present invention has been described herein with reference to the drawings wherein an ultrafiltration step and a reverse osmosis step is performed using only one RO unit and one UF. However, it is understood that in instances where a higher capacity is needed, then a plurality of such UF units and/or RO units may be employed. The number of such units may be increased as needed to achieve the desired capacity.

A wide variety of membranes suitable for use in ultrafiltration and reverse osmosis processes are known and may be selected by one skilled in this art for use in the present invention. Examples of RO and UF membranes are disclosed in publications such as "Reverse Osmosis-Where It Stands Today." *Water and Sewage Works*, October, 1973, page 74, et.seq.;"Membrane Separation Processes," Chemical Engineering, Sept. 4, 1972; and "Membrane Ultrafiltration", *Chemical Technology*, January, 1971, page 56, et. seq.

The foregoing detailed description and the following specific examples are for purposes of illustration only, and are not limiting to the spirit or scope of the appended claims. All references to percentages appearing in the specification and claims are by weight unless otherwise indicated.

EXAMPLE I

This Example illustrates the use of apparatus in accordance with FIG. 1 when practicing the method of the invention.

The waste water to be purified was contaminated with 500 ppm of organic compounds. The contaminants were largely a glycerol propylene oxide ethylene oxide adduct having a molecular weight of about 3,000 and containing about 9% by weight of ethylene oxide. The temperature of the waste water was 20°C.

The waste water was fed via conduit 11 to filter 10 where it was filtered to remove particulates having a size of 5 microns or larger, and the filtered waste water was then passed to pump 15 via conduit 16 at the rate of 1990 gallons per minute. The UF permeate was flowing in conduit 14 at the rate of 10 gallons per minute. Thus, the pump 15 transferred a mixture of the UF permeate and the fresh contaminated waste water to RO unit 17 and it was introduced under pressure via conduit 18 into high pressure compartment 26 at the rate of 2000 gallons per minute. The RO unit 17 was operated at a pressure of 400 psi which was above the osmotic pressure of the waste water stream flowing through RO unit 17. The pore size of the RO membrane 25 was sufficiently small to reject the contaminants and water containing only small amounts of impurities was produced as the RO permeate fraction.

When operating RO unit 17 under the above conditions, a RO permeate fraction was withdrawn under atmospheric pressure from the low pressure compartment 27 via conduit 19 at the rate of 1984 gallons per minute. The RO permeate contained only 20 ppm of contaminating organic compounds and thus it was substantially pure water. A RO concentrate fraction which contained 1.22% of contaminating organic compounds was withdrawn from high pressure compartment 26 via conduit 20 at the rate of 16 gallons per minute. The pressure of the RO concentrate was reduced upon passing through pressure reducing valve 21, and it was then introduced into the high pressure compartment 29 of UF unit 22 at approximately the operating pressure thereof.

The UF unit 22 was operated at a pressure of 60 psi. The UF membrane 28 had a pore size which was sufficiently small to reject compounds having a molecular weight of 20,000 and higher.

When operating the UF unit 22 under the above conditions, a UF permeate fraction containing 1% of contaminating organic compounds was produced. The UF permeate was withdrawn under atmospheric pressure from low pressure compartment 30 and was recycled to the high pressure compartment 26 of RO unit 17 via conduit 14, conduit 16, pump 15 and conduit 18 at the rate of 10 gallons per minute. A UF concentrate fraction containing 16% of contaminating organic compounds was produced and withdrawn from high pressure compartment 29 via conduit 23 at the rate of 6 gallons per minute. Upon passing through pressure regulating valve 24, the pressure of the UF concentrate was reduced to atmospheric pressure.

It is apparent from the foregoing that when operating a water purification system in accordance with FIG. 1, it is possible to produce 1984 gallons per minute of substantially pure water which may be recycled in the plant or used for other purposes. It is also possible to produce 6 gallons per minute of a concentrate fraction containing about 16% by weight of the glycerol propylene oxide ethylene oxide adduct. The concentrate fraction may be further processed by prior art procedures to recover the adduct content for sale or use in other plant processes, or it may be used as boiler fuel without further processing.

EXAMPLE II

This Example illustrates the use of apparatus in accordance with FIG. 2 when practicing the method of the invention.

The contaminated water to be purified in this Example contained 100 ppm of organic compounds as contaminants. The organic compounds were largely a polyoxyethylene adduct of a polyoxypropylene base having a molecular weight of about 1750 wherein the oxyethylene content was 10 weight percent of the molecule. The temperature of the contaminated water stream was 60°C.

The contaminated water stream was fed to filter 32 via conduit 31 where it was filtered to remove large particles of extraneous impurities such as wood chips and trash. The filtered water was passed to pump 36 at the rate of 1.8 gallons per minute and was transferred thereby under pressure into the high pressure compartment 49 of UF unit 37 via conduit 38. Inasmuch as the RO concentrate fraction was flowing in conduit 35 at the rate of 0.2 gallon per minute, a total of 2.0 gallons per minute of contaminated water was introduced into compartment 49. The high pressure compartment 49 was operated at a pressure of 60 psi, and the low pressure compartment 50 was at approximately atmospheric pressure.

When operating the UF unit 37 under the above conditions, a UF permeate containing 0.542% by weight of organic contaminants was produced and withdrawn via conduit 39 at the rate of 2.0 gallons per minute. The UF permeate was passed to pump 40 and transferred thereby under pressure into the high pressure compartment 52 of RO unit 44 via conduit 45. The high pressure compartment 52 was operated under a pressure of 400 psi and the low pressure compartment 53 was at approximately atmospheric pressure. A UF concentrate fraction was produced and withdrawn via conduit 41 at the rate of 0.0036 gallon per minute. The UF concentrate contained 4% of the contaminating organic compounds.

When operating RO unit 44 under the above conditions, a permeate fraction was produced and withdrawn via conduit 46 at the rate of 1.8 gallons per minute which contained 20 ppm of the contaminating organic compounds. A RO concentrate fraction containing 5.42% of contaminating organic compounds was produced and withdrawn via conduit 35 at the rate of 0.20 gallon per minute. The RO concentrate was recycled to the high pressure compartment 49 of UF unit 37 via conduit 35 and conduit 38.

It is apparent from the foregoing that the water purification system illustrated in FIG. 2 of the drawings may be operated as described above to produce a substantially pure water fraction which may be used for the same purposes as fresh tap water. Also, it is possible to produce a concentrate fraction which may be further processed to recover the polyol content or used in other plant processes.

EXAMPLE III

This Example illustrates the use of the apparatus of FIG. 3 when practicing the method of the invention.

The water to be purified in this Example was contaminated with 100 ppm of organic compounds. The organic compounds were largely a propylene oxide adduct of pentaerythritol having a molecular weight of 400. The temperature of the contaminated water stream was 40°C.

The contaminated water was fed to filter 55 via conduit 54 where it was filtered to remove large suspended particles of extraneous impurities. The filtered water was fed at the rate of 1.8 gallons per minute and combined with the UF permeate fraction flowing in conduit 59, and the admixture was passed to pump 62 via conduit 57. The admixture was then combined with the RO concentrate fraction flowing in conduit 58 and introduced under pressure into the high pressure compartment 76 of UF unit 60 via conduit 61 at the rate of 2.04 gallons per minute. The high pressure compartment 76 was operated under a pressure of 60 psi and the low pressure compartment 77 was operated at approximately atmospheric pressure.

When operating the UF unit 60 under the above conditions, a permeate fraction combining 0.548% of contaminating organic compounds was produced at the rate of 2.0 gallons per minute, and a concentrate fraction containing 4.05% of contaminating organic compounds was produced at the rate of 0.04 gallon per minute. The concentrate fraction was withdrawn from the high pressure compartment 76 via conduit 69 and passed to pump 70, and was then introduced into the high pressure compartment 82 of UF unit 71 via conduit 72. The high pressure compartment 82 was operated at a pressure of 60 psi and the low pressure compartment 83 was operated at approximately atmospheric pressure. Under these conditions, UF unit 71 produced a concentrate fraction containing 20.0% of contaminating organic compounds which was withdrawn via conduit 73 at the rate of 0.0007 gallon per minute. UF unit 71 also produced a permeate fraction containing 3.7% of contaminating organic compounds which was withdrawn via conduit 59 at the rate of 0.04 gallon per minute and then recycled to high pressure compartment 76 via conduits 59 and 57, pump 62 and conduit 61.

The permeate fraction produced by UF unit 60 was withdrawn via conduit 63 and passed to pump 64, and was then introduced into the high pressure compartment 79 of RO unit 65 via conduit 66. The pump 64 was operated to provide a pressure of 400 psi within the compartment 79 and the low pressure compartment 80 was operated at approximately atmospheric pressure.

When operating RO unit 65 under these conditions, a permeate fraction containing 20 ppm of organic contaminants was produced and withdrawn via conduit 67 at the rate of 1.8 gallons per minute. A concentrate fraction containing 5.46% of organic contaminants was produced and withdrawn via conduit 58 at the rate of 0.20 gallon per minute. The pressure on the concentrate fraction was reduced upon passing through valve 68 to the operating pressure of compartment 76, and it was then recycled to compartment 76 via conduit 58 and conduit 61.

It is apparent from the foregoing that when operating a water purification system as illustrated in FIG. 3 of the drawings, it is possible to produce a substantially pure water fraction which may be recycled in the plant, or used for other purposes. It is also possible to produce a concentrate fraction which may be further processed to recover the polyol content, or used as a boiler fuel supplement. Neither the RO permeate fraction nor the UF concentrate fraction presents a pollution problem and each fraction may be used advantageously.

EXAMPLE IV

This Example illustrates the use of the apparatus of FIG. 1 when practicing another variant of the method of the invention.

The contaminated water to be purified in this Example contained 500 ppm of organic compounds as contaminants. The contaminants were largely a mixture of equal parts by weight of (a) a glycerol propylene oxide ethylene oxide adduct having a molecular weight of about 3,000 and containing about 9% by weight of ethylene oxide, (b) a polyoxyethylene adduct of a polyoxypropylene base having a molecular weight of about 1750 wherein the oxyethylene content is about 10% by weight of the molecule, and (c) a propylene oxide adduct of pentaerythritol having a molecular weight of about 400. The temperature of the contaminated water stream was 50°C.

The contaminated water was fed to filter 10 via conduit 11 where it was filtered to remove large particles of impurities. The filtered water was passed to pump 15 via conduit 16 at the rate of 500 gallons per minute, and the UF permeate was flowing in conduit 14 at the rate of 100 gallons per minute. Thus, the pump 15 transferred a mixture of UF permeate and fresh contaminated water to RO unit 17 via conduit 18 at the rate of 600 gallons per minute. The high pressure compartment 26 was operated at a pressure of 400 psi which was substantially above the osmotic pressure of the contaminated water stream.

When operating RO unit 17 under the above conditions, an RO permeate fraction was withdrawn continuously from conduit 19 at the rate of 498 gallons per minute. The RO permeate contained 50 ppm of contaminating organic compounds. A RO concentrate fraction containing 2.18% of organic contaminants was withdrawn via conduit 20 at the rate of 102 gallons per minute and, after having the pressure thereon reduced upon passing through pressure reducing valve 21, was introduced into high pressure compartment 29 at approximately the operating pressure thereof.

The high pressure compartment 29 was operated at a pressure of 60 psi and the low pressure compartment 30 at approximately atmospheric pressure. When operating the UF unit 22 under these conditions, a permeate fraction containing 2.0% of contaminating organic compounds was produced and was recycled to the high pressure compartment 26 via conduit 14, conduit 16, pump 15 and conduit 18 at the rate of 100 gallons per minute. A concentrate fraction containing 11.3% of contaminating organic compounds was produced and was withdrawn via conduit 23 at the rate of 2.0 gallons per minute. Upon passing through pressure reducing valve 24, the pressure thereon was reduced to approximately atmospheric pressure.

It is apparent from the foregoing that when operating a water purification system in accordance with that illustrated in FIG. 1 of the drawings and under the conditions of this Example, it is possible to produce 498 gallons per minute of substantially pure water which may be recycled in the plant or used for other purposes. It is also possible to produce 2.0 gallons per minute of a concentrate containing 11.3% by weight of organic compounds. The concentrate may be further processed to recover the polyol content for sale or use in other plant processes, or it may be used directly as a supplemental boiler fuel. In each instance, the RO permeate fraction and the UF concentrate fraction are useful product streams and a pollution problem is not present.

We claim:

1. Apparatus for separating an aqueous medium contaminated with minor amounts of organic materials into an aqueous fraction relatively concentrated with respect to the organic contaminants and a water fraction relatively free of organic contaminants comprising a reverse osmosis unit including a high pressure compartment and a low pressure compartment separated by a reverse osmosis membrane, an ultrafiltration unit including a high pressure compartment and a low pressure compartment separated by an ultrafiltration membrane, the high pressure compartment of the reverse osmosis unit being adapted to operate at a substantially higher pressure than the high pressure compartment of the ultrafiltration unit, first conduit means including fluid pressure reducing means for withdrawing a concentrate fraction under a relatively high pressure from the high pressure compartment of the reverse osmosis unit and introducing it into the high pressure compartment of the ultrafiltration unit under a relatively low pressure, second conduit means including fluid pressure increasing means for withdrawing a permeate fraction from the low pressure compartment of the ultrafiltration unit under a relatively low pressure and introducing it into the high pressure compartment of the reverse osmosis unit under a relatively high pressure, the said high pressure compartment of the reverse osmosis unit, the said first conduit means, the said high pressure compartment of the ultrafiltration unit, the said low pressure compartment of the ultrafiltration unit, and the said second conduit means comprising a circuit for substantially continuously recirculating liquid and at least a portion of the contaminated aqueous medium being recirculated therein, a source of aqueous medium contaminated with minor amounts of organic contaminants to be separated into an aqueous fraction which is relatively concentrated with respect to the organic contaminants and a water fraction which is relatively free of the organic contaminants, the said aqueous medium including organic contaminants having molecular weights of less than 10,000 which are soluble therein initially but have a limited solubility range and are precipitated therefrom upon concentration of the contaminated aqueous medium in the high pressure compartment of the reverse osmosis unit, means including third conduit means for withdrawing contaminated aqueous medium from the said source and introducing it at a substantial rate of flow into the said circuit for recirculating liquid, the high pressure compartment of the reverse osmosis unit being adapted to operate at a pressure in excess of the osmotic pressure of the aqueous medium and at a sufficiently elevated pressure to produce a permeate fraction which passes through the reverse osmosis membrane into the said low pressure compartment and a concentrate fraction in the said high pressure compartment which contains the said organic contaminants in sufficiently high concentration to cause precipitation of at least a portion of the organic contaminants therefrom, the high pressure compartment of the ultrafiltration unit being adapted to operate at a pressure less than 200 pounds per square inch and at a sufficiently elevated pressure to produce a permeate fraction which passes through the ultrafiltration membrane into the said low pressure compartment means including fourth conduit means for withdrawing a permeate fraction which is relatively free of organic contaminants from the low pressure compartment of the reverse osmosis unit, and means including fifth conduit means for withdrawing a concentrate fraction which is relatively concentrated with respect to the organic contaminants from the high pressure compartment of the ultrafiltration unit.

2. The apparatus of claim 1 wherein the said fluid pressure reducing means includes a pressure reducing valve effective to reduce the pressure on the reverse osmosis concentrate fraction from substantially the relatively high operating presssure of the high pressure compartment of the reverse osmosis unit to approximately the relatively low operating pressure of the high pressure compartment of the ultrafiltration unit.

3. The apparatus of claim 1 wherein the said fluid pressure increasing means includes a pump effective to increase the pressure on the ultrafiltration unit permeate fraction from substantially the relatively low operating pressure of the low pressure compartment of the ultrafiltration unit to approximately the relatively high operating pressure of the high pressure compartment of the reverse osmosis unit.

4. The apparatus of claim 1 wherein the said fifth conduit means includes a pressure regulating means whereby the pressure of the withdrawn concentrate fraction may be reduced without adversely affecting the operating pressure within the high pressure compartment of the ultrafiltration unit.

5. The apparatus of claim 1 wherein the said fluid pressure reducing means includes a pressure reducing valve effective to reduce the pressure on the reverse osmosis concentrate fraction from substantially the relatively high operating pressure of the high pressure compartment of the reverse osmosis unit to approximately the relatively low operating pressure of the high pressure compartment of the ultrafiltration unit, the said fluid pressure increasing means includes a pump effective to increase the pressure on the ultrafiltration unit permeate fraction from substantially the relatively low operating pressure of the low pressure compartment of the ultrafiltration unit to approximately the relatively high operating pressure of the high pressure compartment of the reverse osmosis unit, and the said fifth conduit means includes a presssure regulating means whereby the pressure of the withdrawn concentrate fraction may be reduced without adversely affecting the operating pressure within the high pressure compartment of the ultrafiltration unit.

6. The apparatus of claim 1 wherein the said third conduit means includes means for introducing the contaminated aqueous medium withdrawn from the said source into the circuit for recirculating liquid at a point whereby it is passed through the reverse osmosis unit prior to passing through the ultrafiltration unit.

7. The apparatus of claim 6 wherein the said fluid pressure reducing means includes a pressure reducing valve effective to reduce the pressure on the reverse osmosis concentrate fraction from substantially the relatively high operating pressure of the high pressure compartment of the reverse osmosis unit to approximately the relatively low operating pressure of the high pressure compartment of the ultrafiltration unit, the said fluid pressure increasing means includes a pump effective to increase the pressure on the ultrafiltration unit permeate fraction from substantially the relatively low operating pressure of the low pressure compartment of the ultrafiltration unit to approximately the relatively high operating pressure of the high pressure compartment of the reverse osmosis unit, and the said fifth conduit means includes a pressure regulating means whereby the pressure of the withdrawn concentrate fraction may be reduced without adversely affecting the operating pressure within the high pressure compartment of the ultrafiltration unit.

8. The apparatus of claim 1 wherein the said third conduit means includes means for introducing the contaminated aqueous medium withdrawn from the said source into the circuit for recirculating liquid at a point whereby it is passed through the ultrafiltration unit prior to passing through the reverse osmosis unit.

9. The apparatus of claim 8 wherein the said fluid pressure reducing meeans includes a pressure reducing valve effective to reduce the pressure on the reverse osmosis concentrate fraction from substantially the relatively high operating pressure of the high pressure compartment of the reverse osmosis unit to approximately the relatively low operating presssure of the high pressure compartment of the ultrafiltration unit, the said fluid pressure increasing means includes a pump effective to increase the pressure on the ultrafiltration unit permeate fraction from substantially the relatively low operating pressure of the low pressure compartment of the ultrafiltration unit to approximately the relatively high operating pressure of the high pressure compartment of the reverse osmosis unit, and the said fifth conduit means includes a pressure regulating means whereby the pressure of the withdrawn concentrate fraction may be reduced without adversely affecting the operating pressure within the high pressure compartment of the ultrafiltration unit.

10. The apparatus of claim 8 wherein a second ultrafiltration unit is provided including a high pressure compartment and a low pressure compartment separated by an ultrafiltration membrane, the concentrate fraction withdrawn via the said fifth conduit means is introduced into the high pressure compartment of the second ultrafiltration unit, means including sixth conduit means is provided for withdrawing a permeate fraction from the low pressure compartment of the second ultrafiltration unit and introducing it into the said third conduit means, and means including seventh conduit means is provided for withdrawing a concentrate fraction which is relatively concentrated with respect to the organic contaminants from the high pressure compartment of the second ultrafiltration unit.

11. The apparatus of claim 10 wherein the said fluid pressure reducing means includes a pressure reducing valve effective to reduce the pressure on the reverse osmosis concentrate fraction from substantially the relatively high operating pressure of the high pressure compartment of the reverse osmosis unit to approximately the relatively low operating pressure of the high pressure compartment of the ultrafiltration unit, the said fluid pressure increasing means includes a pump effective to increase the pressure on the ultrafiltration unit permeate fraction from substantially the relatively low operating pressure of the low pressure compartment of the ultrafiltration unit to approximately the relatively high operating pressure of the high pressure compartment of the reverse osmosis unit, and the said fifth and seventh conduit means include a pressure regulating means whereby the pressure of the withdrawn concentrate fraction may be reduced without adversely affecting the operating pressure within the high pressure compartments of the ultrafiltration units.

12. The apparatus of claim 1 where the said source of aqueous medium contains at least one hydroxyl terminated polyether polyol as an organic contaminant and at least a portion thereof is initially soluble in the aqueous medium.

13. The apparatus of claim 12 wherein the said source of aqueous medium contains about 100–10,000 parts per million of the hydroxyl terminated polyether polyol and about 1–100 parts per million of water soluble inorganic contaminants.

14. The apparatus of claim 12 wherein the said hydroxyl terminated polyether polyol has a molecular weight of about 300–7000 and is the condensation product of monomeric material selected from the group consisting of ethylene oxide, propylene oxide, butylene oxide and admixtures thereof with at least one compound condensable therewith containing active hydrogen.

15. The apparatus of claim 12 wherein means is provided for heating aqueous medium contaminated with the said hydroxyl terminated polyether polyol at a temperature which is sufficiently high to promote the precipitation thereof from the reverse osmosis concentrate.

16. The apparatus of claim 15 wherein the said heating means is adapted to heat the contaminated aqueous medium at a temperature of about 40°–100°C.

17. The apparatus of claim 16 wherein the said source of contaminated aqueous medium contains about 100–10,000 parts per million of the hydroxyl terminated polyether polyol as an organic contaminant and about 1–100 parts per million of water soluble inorganic contaminants, and the hydroxyl terminated polyether polyol has a molecular weight of about 400–4000 and is the condensation product of monomeric material selected from the group consisting of ethylene oxide, propylene oxide, butylene oxide and admixtures thereof with at least one compound condensable therewith containing active hydrogen.

18. A method of separating an aqueous medium contaminated with minor amounts of organic materials into an aqueous fraction relatively concentrated with respect to the organic contaminants and a water fraction relatively free of organic contaminants comprising
introducing aqueous medium contaminated with organic materials into a reverse osmosis unit including a first high pressure compartment and a first low pressure compartment separated by a reverse osmosis membrane,
the contaminated aqueous medium containing soluble organic contaminants and being introduced into the said first high pressure compartment and maintained therein under a pressure in excess of the osmotic pressure of the contaminated aqueous medium and under a sufficiently elevated pressure whereby reverse osmosis permeate is produced which passes through the reverse osmosis membrane into the said first low pressure compartment and reverse osmosis concentrate is produced which is retained in the said first high pressure compartment by the reverse osmosis membrane,
the reverse osmosis permeate being a water fraction which is relatively free of the organic contaminants and the reverse osmosis concentrate being an aqueous fraction which is sufficiently concentrated with respect to the organic contaminants to cause precipitation of at least a portion of the initially soluble organic contaminants therefrom,
withdrawing the reverse osmosis permeate from the said first low pressure compartment,
withdrawing the reverse osmosis concentrate from the said first high pressure compartment,
introducing the reverse osmosis concentrate into an ultrafiltration unit including a second high pressure compartment and a second low pressure compartment separated by an ultrafiltration membrane,
the reverse osmosis concentrate containing precipitated organic contaminants which are retained by the reverse osmosis membrane and being introduced into the said second high pressure compartment and maintained under a pressure which is substantially lower than the pressure existing in the said first high pressure compartment, the said pressure being less than 200 pounds per square inch but sufficiently elevated whereby ultrafiltration permeate is produced which passes through the ultrafiltration membrane into the said second low pressure compartment and ultrafiltration concentrate is produced which is retained in the said second high pressure compartment by the ultrafiltration membrane,
the ultrafiltration permeate being an aqueous medium contaminated with soluble organic materials which are not retained by the ultrafiltration membrane and the ultrafiltration concentrate being an aqueous fraction relatively concentrated with respect to the organic contaminants,
withdrawing the ultrafiltration concentrate from the said second high pressure compartment,
withdrawing ultrafiltration permeate from the said second low pressure compartment,
introducing the withdrawn ultrafiltration permeate into the said first high pressure compartment and producing therefrom reverse osmosis concentrate containing precipitated organic contaminants which are retained by the ultrafiltration membrane and additional reverse osmosis permeate,
at least a portion of the contaminated aqueous medium being substantially continuously recirculated in a circuit for recirculating liquid which includes the high pressure conpartment of the reverse osmosis unit, the high pressure compartment of the ultrafiltration unit and the low pressure compartment of the ultrafiltration unit, and
introducing into the said circuit for circulating liquid fresh contaminated aqueous medium to be separated into an aqueous fraction relatively concentrated with respect to the organic contaminants and a water fraction relatively free of the organic contaminants,
the said fresh contaminated aqueous medium being introduced at a substantial rate of flow and including at least one contaminating organic material having a molecular weight of less than 10,000 which is soluble therein initially but has a solubility range such that at least a portion thereof is precipitated from the reverse osmosis concentrate whereby the said precipitated contaminating organic material is retained by the ultrafiltration membrane in the said second high pressure compartment and is withdrawn in the ultrafiltration concentrate.

19. The method of claim 18 wherein the organic contaminants comprise organic compounds having molecular weights of about 300–7,000

20. The method of claim 18 wherein the organic contaminants comprise at least one polyol.

21. The method of claim 20 wherein the polyol has a molecular weight of about 300–7,000.

22. The method of claim 20 wherein at least a portion of the polyol is initially soluble in the aqueous medium, and the aqueous medium is heated to an elevated temperature which is sufficiently high to promote the precipitation of the initially soluble polyol from the reverse osmosis concentrate.

23. The method of claim 22 wherein the polyol has a molecular weight of about 400–4,000.

24. The method of claim 18 wherein the said fresh contaminated aqueous medium is introduced into the said circuit for recirculating liquid at a point whereby it is passed through the reverse osmosis unit prior to passing through the ultrafiltration unit.

25. The method of claim 24 wherein the organic contaminants comprise organic compounds having molecular weights of about 300–7,000.

26. The method of claim 24 wherein the organic contaminants comprise at least one polyol.

27. The method of claim 26 wherein the polyol has a molecular weight of about 300–7,000.

28. The method of claim 26 wherein at least a portion of the polyol is initially soluble in the aqueous medium, and the aqueous medium is heated to an elevated temperature which is sufficiently high to promote the precipitation of the initially soluble polyol from the reverse osmosis concentrate.

29. The method of claim 28 wherein the polyol has a molecular weight of about 400–4,000.

30. The method of claim 18 wherein the said fresh contaminated aqueous medium is introduced into the said circuit for recirculating liquid at a point whereby it is passed through the ultrafiltration unit prior to passing through the reverse osmosis unit.

31. The method of claim 30 wherein the organic contaminants comprise organic compounds having molecular weights of about 300–7,000.

32. The method of claim 30 wherein the organic contaminants comprise at least one polyol.

33. The method of claim 32 wherein the polyol has a molecular weight of about 300–7,000.

34. The method of claim 32 wherein at least a portion of the polyol is initially soluble in the aqueous medium, and the aqueous medium is heated to an elevated temperature which is sufficiently high to promote the precipitation of the initially soluble polyol from the reverse osmosis concentrate.

35. The method of claim 34 wherein the polyol has a molecular weight of about 400–4,000.

36. The method of claim 30 wherein the ultrafiltration concentrate withdrawn from the said second high pressure compartment is introduced into a second ultrafiltration unit including a third high pressure compartment and a third low pressure compartment separated by an ultrafiltration membrane.

the withdrawn ultrafiltration concentrate is introduced into the third high pressure compartment and maintained under a pressure which is sufficiently elevated whereby ultrafiltration permeate is produced and passes through the ultrafiltration membrane into the third low pressure compartment and ultrafiltration concentrate is produced which is retained by the ultrafiltration membrane in the said third high pressure compartment, the ultrafiltration permeate in the third low pressure compartment contains soluble organic contaminants which are not retained by the ultrafiltration membrane and the ultrafiltration concentrate in the third high pressure compartment is an aqueous fraction relatively concentrated with respect to the organic contaminants, the ultrafiltration concentrate is withdrawn from the third high pressure compartment, and the ultrafiltration permeate is withdrawn from the third low pressure compartment and is introduced into the said circuit for recirculating liquid.

37. The method of claim 36 wherein the organic contaminants comprise organic compounds having molecular weights of about 300–7,000.

38. The method of claim 36 wherein the organic contaminants comprise at least one polyol.

39. The method of claim 38 wherein the polyol has a molecular weight of about 300–7,000.

40. The method of claim 38 wherein at least a portion of the polyol is initially soluble in the aqueous medium, and the aqueous medium is heated to an elevated temperature which is sufficiently high to promote the precipitation of the initially soluble polyol from the reverse osmosis concentrate.

41. The method of claim 40 wherein the polyol has a molecular weight of about 400–4,000.

42. The method of claim 18 wherein the said fresh contaminated aqueous medium contains at least one hydroxyl terminated polyether polyol as an organic contaminant and at least a portion thereof is initially soluble in the aqueous medium.

43. The method of claim 42 wherein the said fresh contaminated aqueous medium contains about 100–10,000 parts per million of the hydroxyl terminated polyether polyol and about 1–100 parts per million of water soluble inorganic contaminants.

44. The method of claim 42 wherein the said hydroxyl terminated polyether polyol has a molecular weight of about 300–7000 and is the condensation product of monomeric material selected from the group consisting of ethylene oxide, propylene oxide, butylene oxide and mixtures thereof with at least one compound condensable therewith containing active hydrogen.

45. The method of claim 42 wherein the said aqueous medium contaminated with the said hydroxyl terminated polyether polyol is heated at a temperature which is sufficiently high to promote the precipitation thereof from the reverse osmosis concentrate.

46. The method of claim 45 wherein the said contaminated aqueous medium is heated at a temperature of about 40°–100°C.

47. The method of claim 46 wherein the said fresh contaminated aqueous medium contains about 100–10,000 parts per million of the hydroxyl terminated polyether polyol as an organic contaminant and about 1–100 parts per million of water soluble inorganic contaminants, and the hydroxyl terminated polyether polyol has a molecular weight of about 400–4000 and is the condensation product of monomeric material selected from the group consisting of ethylene oxide, propylene oxide, butylene oxide and admixtures thereof with at least one compound condensable therewith containing active hydrogen.

* * * * *